United States Patent
Baleine et al.

(10) Patent No.: US 8,749,629 B2
(45) Date of Patent: Jun. 10, 2014

(54) APPARATUS AND METHOD FOR TEMPERATURE MAPPING A TURBINE COMPONENT IN A HIGH TEMPERATURE COMBUSTION ENVIRONMENT

(75) Inventors: Erwan Baleine, Orlando, FL (US); Danny M. Sheldon, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 339 days.

(21) Appl. No.: 13/023,774

(22) Filed: Feb. 9, 2011

(65) Prior Publication Data

US 2012/0200698 A1 Aug. 9, 2012

(51) Int. Cl.
H04N 7/18 (2006.01)

(52) U.S. Cl.
CPC ........ *H04N 7/18* (2013.01); *G05B 2219/37509* (2013.01); *G05B 2219/37211* (2013.01)
USPC ......................................................... 348/135

(58) Field of Classification Search
CPC ......................................................... G01J 5/08
USPC .......... 348/135, 142; 250/339.09, 330; 374/4; 850/5
See application file for complete search history.

(56) References Cited

U.S. PATENT DOCUMENTS

| | | | |
|---|---|---|---|
| 4,627,740 A | 12/1986 | Jerde et al. | |
| 5,326,170 A | 7/1994 | Moslehi et al. | |
| 6,062,811 A | 5/2000 | Zombo et al. | |
| 6,106,150 A | 8/2000 | Lindholm et al. | |
| 6,231,228 B1 | 5/2001 | Brotz | |
| 6,354,732 B1 | 3/2002 | Casati et al. | |
| 6,561,694 B1 | 5/2003 | Lerch et al. | |
| 6,570,175 B2 | 5/2003 | Bales et al. | |
| 6,881,584 B1* | 4/2005 | Lenhard et al. | 436/147 |
| 7,422,365 B2 | 9/2008 | Chamberlain et al. | |
| 7,452,125 B2 | 11/2008 | Volf et al. | |
| 7,690,840 B2 | 4/2010 | Zombo et al. | |
| 2002/0164060 A1* | 11/2002 | Paik et al. | 382/128 |
| 2003/0138025 A1* | 7/2003 | Archibald et al. | 374/6 |
| 2010/0040881 A1* | 2/2010 | Beck | 428/402 |
| 2010/0224772 A1* | 9/2010 | Lemieux et al. | 250/252.1 |
| 2011/0041223 A1* | 2/2011 | Jesse et al. | 850/5 |

OTHER PUBLICATIONS

Yoshiro Yamada, Uncertainty of Radiation Thermometers Calibrated by Interpolation between Fixed Points, Aug. 18-21, 2009, ICROS-SICE International Joint Conference 2009, Fukuoka International Congress Center, Japan, p. 1.*

(Continued)

*Primary Examiner* — Y Lee
*Assistant Examiner* — Joseph Suh

(57) ABSTRACT

Method and system for calibrating a thermal radiance map of a turbine component in a combustion environment. At least one spot (18) of material is disposed on a surface of the component. An infrared (IR) imager (14) is arranged so that the spot is within a field of view of the imager to acquire imaging data of the spot. A processor (30) is configured to process the imaging data to generate a sequence of images as a temperature of the combustion environment is increased. A monitor (42, 44) may be coupled to the processor to monitor the sequence of images of to determine an occurrence of a physical change of the spot as the temperature is increased. A calibration module (46) may be configured to assign a first temperature value to the surface of the turbine component when the occurrence of the physical change of the spot is determined.

9 Claims, 2 Drawing Sheets

(56) References Cited

OTHER PUBLICATIONS

J. R. Markham et al., Thermal Radiative Properties and Temperature Measurement from Turbine Coatings; International Journal of Thermophysics.; vol. 19, No. 2; 1998, pp. 537-545; Plenum Publishing Corporation.

Alan G. Beattie et al., Non-Destructive Evaluation of Wind Turbine Blades Using and Infrared Camera, American Institute of Aeronautics and Astronautics; AIAA 99-0046, pp. 1-8.

J. Martan et al., IR Radiometry Optical System View Factor and Its Application to Emissivity Investigations of Solid and Liquid Phases, International Journal Thermophys; 2007; No. 28; pp. 1342-1352, Springer Science & Business Media, LLC.

Fred Best et al., Temperature Sensor Calibration Using Melt Signatures of Phase Change Materials, University of Wisconsin-Madison Space Science and Engineering Center, Winter 2009, pp. 8-9.

\* cited by examiner

APPARATUS AND METHOD FOR TEMPERATURE MAPPING A TURBINE COMPONENT IN A HIGH TEMPERATURE COMBUSTION ENVIRONMENT

STATEMENT REGARDING FEDERALLY SPONSORED DEVELOPMENT

Development for this invention was supported in part by Contract No. DE-FC26-05NT42644, awarded by the United States Department of Energy. Accordingly, the United States government may have certain rights in this invention.

FIELD OF THE INVENTION

The present invention is generally related to thermography, and, more particularly, to a thermal imaging system and techniques for temperature mapping a turbine component in a high temperature combustion environment.

BACKGROUND OF THE INVENTION

It is known to use various superalloy materials, such as cobalt or nickel-based superalloys, for making blades, vanes and other components for power generating turbines, propulsion equipment, etc. These turbines can operate at relatively high temperatures and are generally protected by a series of protective coatings. The coatings may comprise layers of metallic base coats, thermally grown oxide layers, as such layers grow in service-run components and a final ceramic thermal barrier coating ("TBC"). Long-term exposure of these ceramic coatings to the hostile, high temperature, abrasive environment in which such turbines typically operate can cause phase destabilization, sintering, microcracking, delamination and ultimately spallation within the coating layers, exposing the superalloy component and possibly resulting in rapid degradation or failure and potentially requiring costly and burdensome repairs.

U.S. Pat. No. 7,690,840 titled "Method And Apparatus For Measuring On-Line Failure Of Turbine Thermal Barrier Coatings" describes an infrared (IR)-based system configured to non-destructively measure the radiance of a turbine component in a gas turbine in the context of monitoring the formation and progression of TBC defects where images of relative high spatial resolution are needed but where accurate absolute temperature information may not be needed. The foregoing patent is commonly assigned to the assignee of the present invention and is herein incorporated by reference in its entirety.

It would be desirable to acquire two-dimensional IR images of the turbine component to consistently provide accurate absolute temperature measurements of the component. However, temperature measurement errors can be introduced due to various factors, which under prior techniques have not been appropriately accounted for. For example, the emissivity of the TBC can change as a function of wavelength, temperature, age, contamination, etc. Accordingly, it is desirable to provide a system and techniques that overcome the foregoing issues.

BRIEF DESCRIPTION OF THE DRAWINGS

The invention is explained in the following description in view of the drawings that show.

DETAILED DESCRIPTION OF THE INVENTION

In accordance with one or more embodiments of the present invention, structural arrangements and/or techniques conducive to accurate measurements of the absolute temperature of a turbine component, such as a rotating turbine blade or a stationary vane, essentially in real-time are described herein. In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
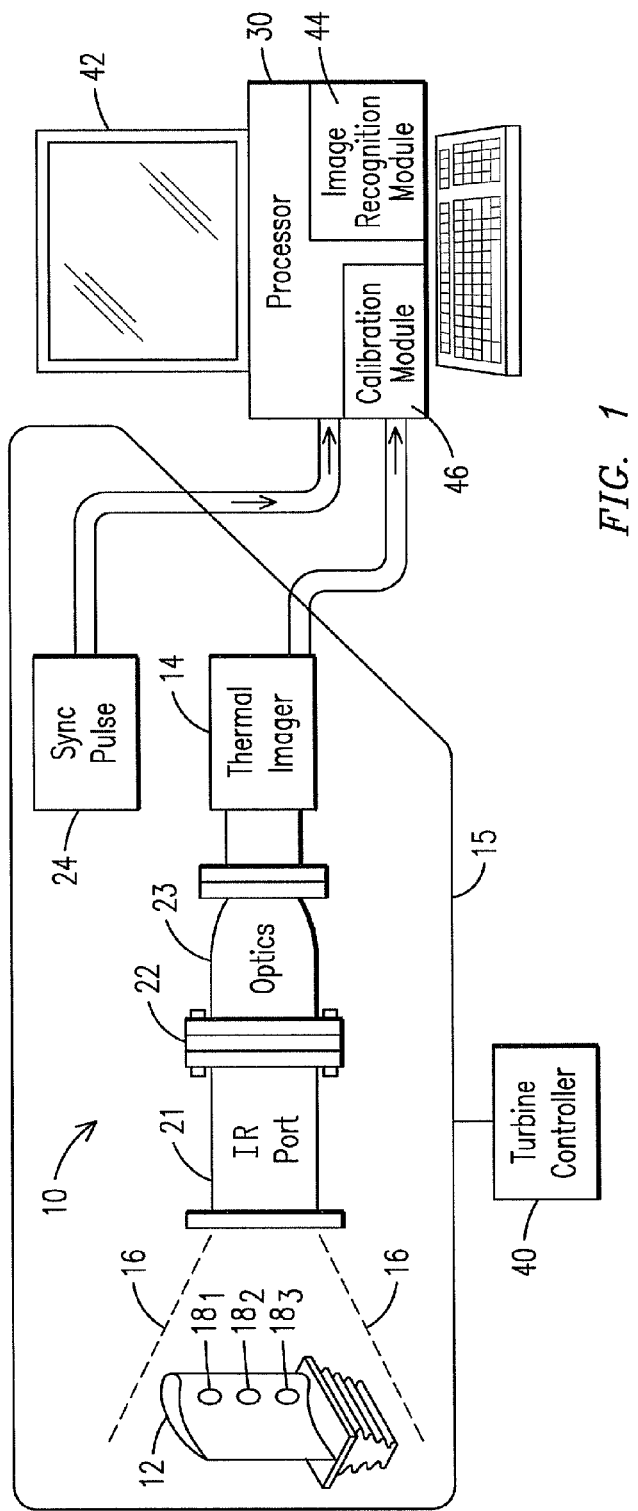
FIG. 1 is a schematic representation of one example embodiment of a thermographic system as may be configured to map a temperature distribution over a surface of a turbine component in a turbine under operating conditions.

FIG. 1 is a schematic representation of one example embodiment of a thermographic system 10 configured to map a temperature distribution over a surface of a turbine component 12 (e.g., a turbine blade, a turbine vane, etc.) in a turbine 15 under operating conditions. For example, the blades may be moving at supersonic linear speeds in the order of approximately Mach 1.2 or 890 miles per hour. Example surface temperature for a turbine component under typical operating conditions may be in a range of approximately 1000 Deg. C. to approximately 1800 Deg. C.

As shown in FIG. 1, one or more spots of material, such as spots $18_1$, $18_2$, $18_3$, may be deposited or otherwise disposed on a surface of the turbine component. As used herein, the term spot comprises a relatively thin piece of material having a known physical characteristic (e.g., a known melting point) affixed to the surface of the component. It will be appreciated that although FIG. 1 illustrates rounded shapes for the spots, it will be appreciated that aspects of the present invention are not limited to any particular shape for the spots. For example, one could use non-rounded shapes, such as stripes, etc. Moreover, although a number of three spots are illustrated in FIG. 1, such a number should not be construed in a limiting sense since such a number just represents an example number of spots that may be used.

In one example embodiment, the respective materials of spots $18_1$, $18_2$, $18_3$ may have a different melting point relative to one another and may be arranged on the surface of the component in spaced-apart relationship from one another. It will be appreciated that the example arrangement for the spots shown in FIG. 1 (i.e., column-like arrangement) should not be construed in a limiting sense since other arrangements may work equally effective (row, diagonal, random).

In one example embodiment, for a given spectral region of the electromagnetic spectrum, such as corresponding to the near-infrared (IR) spectral region, a respective emissivity value of the spot materials may have a distinct value relative to an expected emissivity value of the surface of the component. For example, this would allow distinguishing IR emissions from the spots relative to IR emissions from the surface component.

In one example embodiment, a turbine controller 40 may be configured to control the turbine so that the temperature of the combustion environment of the turbine may be increased over a predefined temperature range.

A thermal imager 14 senses within a field of view (as may be conceptually defined by lines 16) IR emissions (e.g., near-IR emissions) from the turbine component. For example, an IR port 21 may be arranged to provide a direct "line of sight" to component 12 including spots $18_1$, $18_2$, $18_3$. In one example embodiment, thermal imager 14 may comprise a focal plane array sensor (e.g., an array of charged coupled devices (CCD)) to measure the emitted radiance of the component. To obtain the appropriate spatial resolution from a moving blade at Mach 1.2 speeds, the focal plane array sensor should be able to integrate a received IR signal within 3 microseconds or less.

A pressure barrier 22 may be used to pass the IR emissions from an IR port 21 to an optical system 23 for appropriate optical signal conditioning (e.g., focal length selection and appropriate optical magnification) prior to such signals being received by thermal imager 14.

A processor 30 is coupled to thermal imager 14 to process imaging data from thermal imager, such as may be used to generate a sequence of images of spots $18_1$, $18_2$, $18_3$, as the temperature of the combustion environment turbine is increased.

In one example embodiment, a monitor 42 may be coupled to processor 30. In this example embodiment, a human user may use monitor 42 to monitor the sequence of images of spots $18_1$, $18_2$, $18_3$ to determine a respective occurrence of a respective physical change in the respective spots $18_1$, $18_2$, $18_3$ as the temperature of the combustion environment turbine is increased. The respective physical change in the respective spots $18_1$, $18_2$, $18_3$ is due to a melting of the respective spot material.

It should be appreciated that monitor 42 need not be limited to a visual display monitor, since it is contemplated that in one example embodiment processor 30 may optionally include an image recognition module 44 configured to automatically determine the occurrence of the respective physical change in the respective spots.

As will be appreciated by one skilled in the art, the physical change may comprise a total or partial separation of any given spot from the surface of the component. For example, a substantial portion of the molten spot material may fly-off from the surface of the component due to centrifugal forces and/or the high-speed gases that pass by the surface of the component. It will be appreciated that the physical change due to a melting of the respective spot material need not be limited to physical separation of the spot from the surface of the component. For example, the physical change may involve a distortion of the spot due to changes in the adhesion and cohesive forces affecting the spot material when melting. Table 1 is illustrative of some example spot materials.

TABLE 1

| | Melting Temperature [C.] |
|---|---|
| Platinum | 1770 |
| Titanium | 1670 |
| Stainless Steel | 1510 |
| Nickel | 1453 |
| Beryllium | 1411 |
| Copper | 1285 |
| Glassy Material | Varies based on composition content |

A calibration module 46 may be configured to assign respective temperature values to the surface of the turbine component when the occurrence of the physical change of the respective spots is determined. For example, if the respective melting points of spot $18_1$ is lower than the melting point of spot $18_2$, and the melting point of spot $18_2$ is lower than the melting point of spot $18_3$, then in this example a first temperature value may be assigned when the physical change of spot $18_1$ is determined, a second temperature value may be assigned when the physical change of spot $18_2$ is determined and a third temperature value may be assigned when the physical change of spot $18_3$ is determined.

Figure 2:
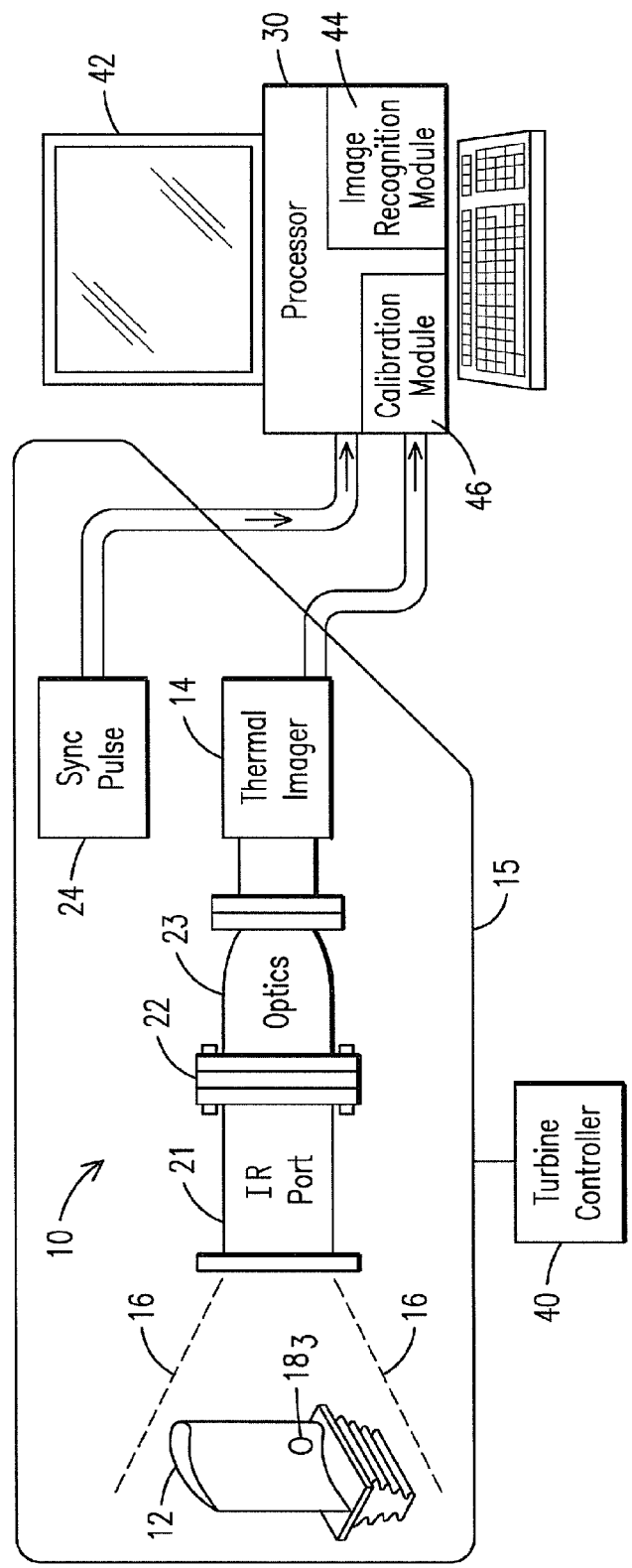
FIG. 2 illustrates an example condition of a turbine component undergoing a calibration process embodying aspects of the present invention.

FIG. 2 illustrates an example condition where the temperature of the combustion environment of the turbine is being increased to reach the melting point of spot $18_3$, and where spots $18_1$ and $18_2$, have already reached their respective melting points and essentially separated from the surface of the component.

Figure 3:
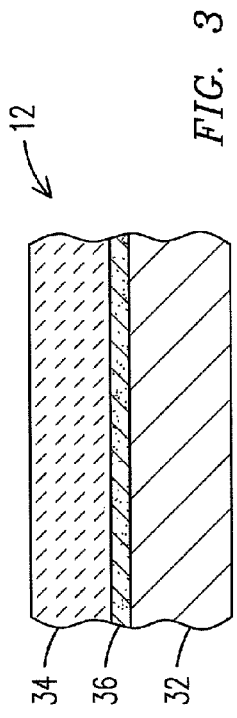
FIG. 3 is a partial cross-sectional view of an example component having a substrate material that may be covered by a thermal barrier coating (TBC) for use in a high temperature environment.

FIG. 3 is a partial cross-sectional view of an example component 12 having a substrate material 32 covered by a barrier coating such as a layer of a thermal barrier coating (TBC) 34 for use in the high temperature environment. As would be readily appreciated by one skilled in the art of TBC coatings, a bond coat 36 such as a MCrAlY material may be deposited on the substrate 32 prior to the application of the TBC material 34 to improve the adherence of the coating 34 to the substrate 32. It will be appreciated that aspects of the present invention are not limited to the example coating arrangement shown in FIG. 3 nor are such aspects limited to components having a TBC coating.

Processor 30 may be further configured to generate a radiance map of the component based on the IR emissions from the turbine component. In accordance with aspects of the present invention, the radiance map may be calibrated based on the temperature values assigned by calibration module 46 to generate a calibrated thermal map of the component that displays absolute temperature over the surface of the component. In case of a rotating component, for synchronization purposes, a revolution-per-minute (RPM) sensor 24 may be used to provide a synchronization pulse to processor 30.

Aspects of the invention can also be embodied as computer readable code stored on a computer readable medium. The computer readable medium may be any physical data storage device that can store data, which thereafter can be read by a computer system. Examples of a computer readable medium may include read-only memory, random-access memory, CD-ROMs, DVDs, magnetic tape, optical data storage devices. It will be appreciated by one skilled in the art that the computer readable code may be distributed via a computer readable transmission medium to a network-coupled computer system where the computer readable code may then be stored and/or executed in a distributed fashion.

Based on the foregoing specification, aspects of the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for example, a fixed (hard) drive, diskette, optical disk, magnetic tape, semiconductor memory such as read-only memory (ROM), etc., and may involve a transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using or selling aspects of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer sub-system embodying aspects of the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for calibrating a thermal radiance map of a rotating turbine component in a high temperature combustion environment of a turbine, the method comprising:
    disposing at least two spaced-apart spots of respective materials on a surface of the turbine component, the respective materials having different melting points;
    operating the turbine and thus causing rotation of the turbine component;
    arranging an imager so that said at least two spots are within a field of view of the imager to acquire imaging data of the rotating turbine component including said at least two spots;
    increasing a temperature of the combustion environment of the turbine;
    processing the imaging data to generate a sequence of two-dimensional images of the rotating turbine component including said at least two spots as the temperature of the combustion environment turbine is increased;
    monitoring the sequence of images including said at least two spots to determine occurrences of respective physical changes of said at least two spots as the temperature of the combustion environment turbine is increased, wherein the respective physical changes are due to melting of the respective materials, wherein the melting points of the respective materials are known;
    assigning respective temperature values to the surface of the rotating turbine component when the occurrences of the respective physical changes of said at least two spots are determined, wherein the respective temperature values assigned to the surface of the rotating turbine component correspond to the known melting points of the respective materials;
    generating a thermal radiance map of the rotating turbine component based on infrared (IR) emissions from the rotating turbine component; and
    calibrating the radiance map of the rotating turbine component based on the assigned temperature values to generate a calibrated thermal map of the rotating turbine component that indicates absolute temperature over the surface of the rotating turbine component.

2. The method of claim 1, wherein the increasing of the temperature of the combustion environment of the turbine comprises controlling the turbine so that the temperature of the combustion environment of the turbine is increased over a predefined temperature range.

3. The method of claim 1, wherein the turbine component comprises a thermal barrier coating (TBC).

4. The method of claim 1, wherein the monitoring of the sequence of images including said at least two spots comprises automatically determining the occurrence of the respective physical changes of said at least two spots.

5. A system for calibrating a thermal radiance map of a rotating turbine component in a high temperature combustion environment of a turbine, the system comprising:
    at least two spaced-apart spots of respective materials disposed on a surface of the turbine component, wherein in at least a spectral region of the electromagnetic spectrum respective emissivity values of said at least two spots of respective materials have distinct values relative to an emissivity value of the surface of the turbine component;
    a controller to operate the turbine and thus cause rotation of the turbine component;
    an infrared (IR) imager arranged so that said at least two spots are within a field of view of the imager to acquire in the spectral region imaging data of the rotating turbine component including said at least two spots;
    a processor configured to process the imaging data including said at least two spots to generate a sequence of two-dimensional images of the rotating component including said at least two spots as a temperature of the combustion environment turbine is increased;
    a monitor coupled to the processor to monitor the sequence of images including said at least two spots to determine occurrences of respective physical changes of said at least two spots as the temperature of the combustion environment turbine is increased, wherein the respective physical changes of said at least two spots are due to melting of the respective materials, wherein the respective materials having different melting points, wherein the melting points of the respective materials are known; and
    a calibration module configured to assign respective temperature values to the surface of the rotating turbine component when the occurrences of the respective physical changes of said at least two spots are determined, wherein the respective temperature values assigned by the calibration module to the surface of the rotating turbine component correspond to the known melting points of the respective materials,
    wherein the processor is configured to generate a thermal radiance map of the rotating turbine component based on infrared (IR) emissions from the rotating turbine component, and to calibrate the radiance map of the rotating turbine component based on the assigned temperature values to generate a calibrated thermal map of the rotating turbine component that indicates absolute temperature over the surface of the rotating turbine component.

6. The system of claim 5, wherein the controller configured to control the turbine so that the temperature of the combustion environment of the turbine is increased over a predefined temperature range.

7. The system of claim 6, wherein the spot material comprises one of a metal material and a glassy material having a respective melting point in the predefined temperature range.

8. The system of claim 5, wherein the turbine component comprises a thermal barrier coating (TBC).

9. The system of claim 5, wherein the monitor comprises an image recognition module configured to automatically determine the occurrences of the respective physical changes of said at least two spots.

* * * * *